(12) United States Patent
Farres et al.

(10) Patent No.: US 10,766,472 B2
(45) Date of Patent: Sep. 8, 2020

(54) ABS STRATEGY FOR HYBRID BRAKE ACTUATORS

(71) Applicant: VOLVO TRUCK CORPORATION, Gothenburg (SE)

(72) Inventors: Lionel Farres, Heyrieux (FR); Christophe Long, Brindas (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 287 days.

(21) Appl. No.: 15/742,916

(22) PCT Filed: Jul. 27, 2015

(86) PCT No.: PCT/IB2015/001779
§ 371 (c)(1),
(2) Date: Jan. 9, 2018

(87) PCT Pub. No.: WO2017/017490
PCT Pub. Date: Feb. 2, 2017

(65) Prior Publication Data
US 2018/0229705 A1 Aug. 16, 2018

(51) Int. Cl.
| B60T 13/66 | (2006.01) |
| B60T 7/22 | (2006.01) |
| B60T 8/172 | (2006.01) |
| B60T 13/74 | (2006.01) |
| B60T 13/68 | (2006.01) |
| B60T 13/58 | (2006.01) |
(Continued)

(52) U.S. Cl.
CPC .............. *B60T 13/662* (2013.01); *B60T 7/22* (2013.01); *B60T 8/172* (2013.01); *B60T 13/588* (2013.01); *B60T 13/683* (2013.01); *B60T 13/741* (2013.01); *B60T 2270/10* (2013.01); *B60T 2270/20* (2013.01); *B60T 2270/30* (2013.01); *F16D 2121/08* (2013.01); *F16D 2121/24* (2013.01)

(58) Field of Classification Search
CPC .......... B60T 13/662; B60T 7/22; B60T 8/172; B60T 13/588; B60T 13/683; B60T 13/741; B60T 2270/10; B60T 2270/20; B60T 2270/30; F16D 2121/08; F16D 2121/24
USPC .............................................. 701/70
See application file for complete search history.

(56) References Cited

U.S. PATENT DOCUMENTS

| 5,931,887 A | * | 8/1999 | Hac | ...................... | B60T 8/17552 |
| | | | | | 303/140 |
| 6,035,251 A | * | 3/2000 | Hac | ........................ | B60T 8/1755 |
| | | | | | 303/140 |

(Continued)

FOREIGN PATENT DOCUMENTS

| EP | 2305524 A1 * | 4/2011 | ............ B60T 13/583 |
| JP | 5312784 B2 * | 10/2013 | ......... F16D 65/0971 |

(Continued)

OTHER PUBLICATIONS

International Search Report (dated Mar. 31, 2016) for corresponding International App. PCT/IB2015/001779.

*Primary Examiner* — Tuan C To
(74) *Attorney, Agent, or Firm* — Withrow & Terranova, PLLC

(57) ABSTRACT

A method of managing the braking force applied on the wheels of a vehicle including hybrid brake actuators is provided. In particular, safety functions, such as ABS and ESP are performed using hybrid actuators.

14 Claims, 4 Drawing Sheets

(51) Int. Cl.
*F16D 121/08* (2012.01)
*F16D 121/24* (2012.01)

(56) References Cited

U.S. PATENT DOCUMENTS

| | | | | |
|---|---|---|---|---|
| 6,079,800 | A * | 6/2000 | Lin | B60T 8/1764 303/140 |
| 6,209,972 | B1 * | 4/2001 | Matsuno | B60T 8/1755 303/140 |
| 6,547,343 | B1 * | 4/2003 | Hac | B60T 8/1755 303/140 |
| 7,349,778 | B2 * | 3/2008 | Shin | B60W 30/02 701/41 |
| 9,022,488 | B2 | 5/2015 | Beier et al. | |
| 9,505,385 | B2 * | 11/2016 | Yasui | F16D 55/225 |
| 2005/0264102 | A1 | 12/2005 | Tezuka | |
| 2006/0017317 | A1 * | 1/2006 | Howell | B60T 8/4809 303/7 |
| 2007/0267915 | A1 * | 11/2007 | Shimada | B60K 6/44 303/122 |
| 2009/0195058 | A1 | 8/2009 | Jackson et al. | |
| 2009/0248269 | A1 * | 10/2009 | Yasui | B60T 8/17552 701/74 |
| 2011/0224880 | A1 | 9/2011 | Baehrle-Miller et al. | |
| 2012/0309288 | A1 * | 12/2012 | Lu | H04K 3/45 455/1 |
| 2013/0009456 | A1 * | 1/2013 | Schiel | B60T 11/224 303/20 |
| 2013/0080017 | A1 * | 3/2013 | Bohm | B60T 13/662 701/78 |
| 2013/0257140 | A1 * | 10/2013 | Ogiwara | B60T 1/10 303/3 |
| 2014/0365053 | A1 * | 12/2014 | Pita-Gil | B60L 7/22 701/22 |
| 2016/0001752 | A1 * | 1/2016 | Yasui | B60T 13/741 701/70 |
| 2018/0229705 | A1 * | 8/2018 | Farres | B60T 13/588 |

FOREIGN PATENT DOCUMENTS

| | | | |
|---|---|---|---|
| KR | 20120061651 A * | 6/2012 | |
| KR | 101261978 B1 * | 5/2013 | |
| KR | 101261978 B1 | 5/2013 | |
| WO | WO-2014188516 A1 * | 11/2014 | B60W 30/18127 |
| WO | 2016000730 A1 | 1/2016 | |

* cited by examiner

ABS STRATEGY FOR HYBRID BRAKE ACTUATORS

BACKGROUND AND SUMMARY

The invention is directed to a method of managing the braking force applied on the wheels of a vehicle, wherein the brake actuators comprise a pneumatic actuator and an electric actuator. In particular, safety functions, such as ABS and ESP are performed using hybrid actuators activated by both electrical energy and pneumatic energy.

The braking system of the vehicles, designed to brake the vehicle under request of the driver, comprises in addition automatic safety functions, such as an antilock brake system (ABS), an electronic stability control (ESC), or a traction control system (TCS). In case of a pneumatic brake, the air pressure applied to the brakes is electronically managed, in such a way that the vehicle is braked under safe conditions. The safety functions are performed by the means of complicated and expensive electro-pneumatic systems and valves. Further, in case of failure within the pneumatic circuit, the safety functions may be disabled.

In the framework of weight reduction, and reduction of the energy consumption of the vehicles, hybrid brake actuators are used, which are activated by both pneumatic energy and electric energy. Example of such a hybrid brake actuator is described in the patent application PCT/EP2014/001813. However, the safety functions above-mentioned are still performed by the pneumatic system, and thus present the same drawbacks than a traditional pneumatic braking system.

It is desirable to improve the safety functions of a braking system comprising hybrid brake actuators.

The present invention provides a method of managing the braking force on a wheel of a vehicle equipped with at least a pair of hybrid brake actuators, wherein each hybrid brake actuator comprises a pneumatic brake actuator, delivering a main braking force, and an electric brake actuator, delivering a complementary braking force. The present method comprises the steps of:

Determining a targeted braking force,
Applying a main braking force to the wheel by the means of a first actuator;
applying a complementary braking force to the wheel by the means of a second actuator in such a way that the requested braking force is effectively delivered;
Monitoring the braking force delivered at the wheel,
modulating one or more of the main braking force and the complementary braking force, The main braking force and the complementary braking force are preferably applied in such a way that the main braking force is equal or higher than the complementary braking force. The resulting delivered braking force may be limited to the maximal braking force of the pneumatic system in order to avoid overstress of the braking system.

In one aspect, the complementary braking force is modulated at each individual wheel to provide the safety functions like ESC, ABS or TCS. To this extend, the complementary braking force may be automatically released or increased depending on the running conditions.

In another aspect, the main braking force is equally modulated at two or more wheels to provide the safety functions, like ESC, ABS or TCS, and the complementary braking force is in turn modulated at each individual wheel.

The main braking force and the complementary braking force are preferably managed by two separate ECUs.

In a further aspect, the complementary braking force allows to compensate potential failure of the safety functions in the pneumatic system.

In particular, the method may further comprise the steps of
Monitoring one or more of the main braking force and the global braking force applied to the wheel,
Identifying a failure within the pneumatic system,
Deactivating one or more of the pneumatic safety functions,
Activating or over activating the electrical actuator to provide one or more of the safety functions.

In addition, the present method allows to compensate braking failure of the pneumatic system, in case air pressure is not sufficient to reach the targeted braking request, by activation or over activation of the electrical brake actuators.

According to the present method, one or more of the pneumatic brake actuators and electrical brake actuators may also be automatically activated.

The present invention is further directed to a vehicle having at least a pair of hybrid brake actuators, comprising a pneumatic brake actuator and an electric brake actuator, and wherein the braking force is managed according to the method hereby described.

DETAILED DESCRIPTION

Figure 1:
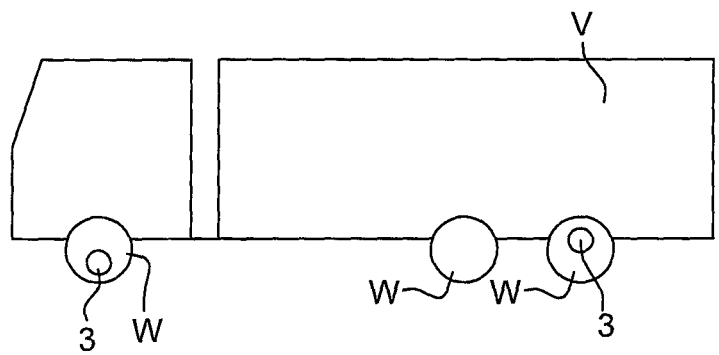
FIG. 1: truck equipped with hybrid brake actuators
Figure 2:
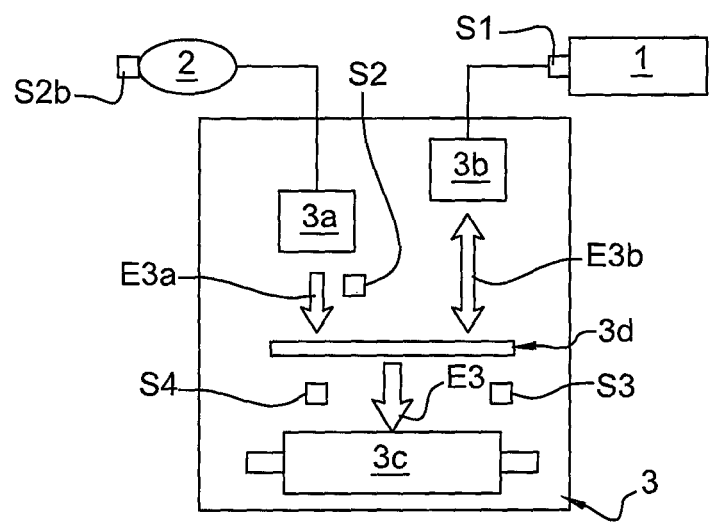
FIG. 2: hybrid brake actuator
Figure 3:
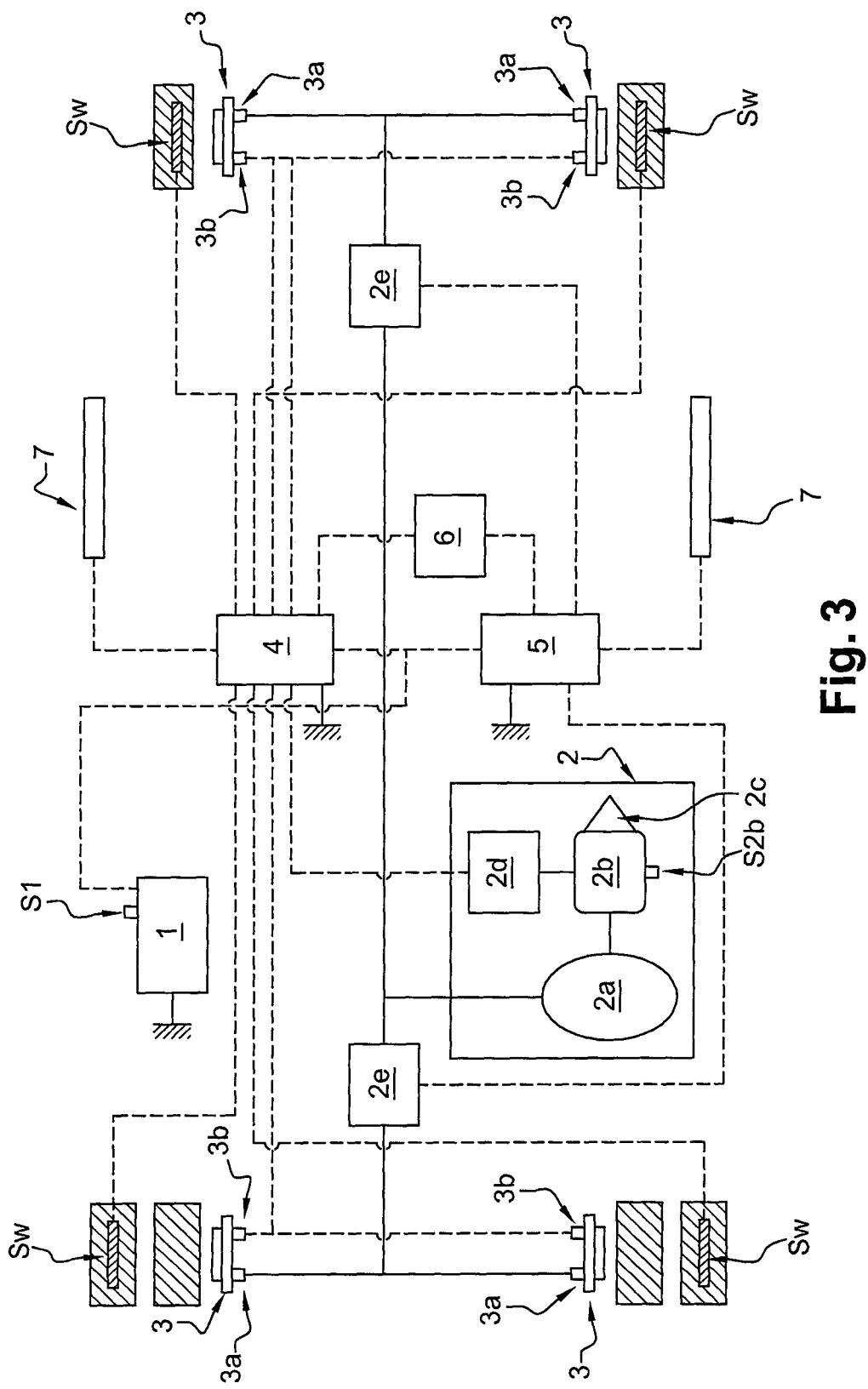
FIG. 3: arrangement of the electrical circuit and the pneumatic circuit for the hybrid brake actuators. Connections between elements in plain lines relate to the fluidic connections. Dotted lines denote electrical connections and/or information exchanges.

The present invention is directed to a vehicle v, having a set of wheels w, wherein at least one wheel, preferably a pair of wheels of a same axle, is equipped with a hybrid brake actuator 3. An hybrid brake actuator encompasses any brake actuator comprising 2 different actuators selected from a hydraulic actuator, a pneumatic actuator, and an electric actuator. Preferably, in the hybrid brake actuators 3, also defined as bi-energy brake actuators, the brake caliper 3*c* is activated by a pneumatic actuator 3*a*, or an electric actuator 3*b*, or both of them simultaneously. The hybrid brake actuators 3 are either on the front axle or on a rear axle. Preferably the front axle and one of the rear axles of the vehicle v are equipped with hybrid brake actuators 3. In case the vehicle tows a trailer or a semi-trailer, the trailer or semi-trailer is advantageously equipped with at least one, preferably 2, hybrid brake actuators 3. The pneumatic actuator 3*a* is activated by compressed air supplied by a compressed air supply unit 2. The compressed air unit 2 comprises at least an air tank 2*a*, a compressor 2*b*, and an air filtration module 2*c*. The compressed air unit 2 may optionally comprise a trailer control module 2*d*. The pneumatic brake circuit may further comprise one or more electronic brake system module 2*e*.

The electric brake actuator 3b is supplied by an electrical power supply unit 1. The electrical actuator 3b is not reversible. In other words, the electrical actuator 3b needs energy to be withdrawn once it has been activated. The electric brake actuator 3b may for example comprise a worm actuated by the rotation of an electrical motor. Such a worm cannot be reversed without the action of the electrical motor.

The pneumatic brake actuator 3a and the electric brake actuator 3b generate respectively an effort E3a and E3b on a transfer module 3d. The braking effort, combining E3a and E3b, is preferably transmitted through a brake piston (not represented). E3 denotes the effort transmitted via the transfer module 3d to the brake caliper 3c. E3 is the sum of the efforts E3a and E3b, which means that the transfer plate 3d allows adding up the efforts delivered by the actuators 3a and 3b.

The pneumatic brake actuator 3a is advantageously provided with a pressure level sensor S2. An additional pressure sensor S2b may be optionally provided upstream in the pneumatic circuit. The position of the brake piston may be monitored by a brake piston position S3. An electrical power consumption S1 may further be provided to monitor the power consumption of the electrical actuator 3b. Alternatively or in addition, a braking force sensor S4 may be provided on the brake caliper 3c or at another place, in order to determine the global braking force.

The pneumatic actuator 3a and the electric actuator 3b are advantageously connected to, and managed by, two distinct electronic control units (ECU), which are both connected to the brake pedal 6. More particularly, the electric actuator 3a may be connected to a first ECU 4, and the pneumatic brake actuator 3b, may be connected to a second ECU 5. The status of the brake pedal 6 is simultaneously communicated to the first ECU 4, and the second ECU 5. Depending on the running conditions, both brake actuators 3a and 3b may be activated or only one of them.

The present invention is further directed to a method wherein the braking force on the wheels equipped with hybrid actuators 3 is controlled in such a way to improve the safety braking functions like ESP, ABS, TCS.

In particular, the method comprises a first step of determination of the targeted braking force FT. Such a targeted braking force FT may be requested by the driver, through a pressure on the brake pedal 6. In that case, the requested braking force FT may be determined according to the position of the brake pedal 6, which is defined by at least one sensor (not shown), preferably two sensors. The progression of the braking power may be linear, or proportional, to the position of the brake pedal 6. In other words, 50% of the travel of the brake pedal 6 may correspond to a braking force of 50% of the maximum braking power, no action on the brake pedal 6 means that no braking force is requested, and full pressure on the brake pedal 6 means that the full brake power is requested. However, many other linear or non-linear braking progressions may be considered. In general, any known brake pedal law can be used to determine the targeted braking force FT, based on the driver's request.

Alternatively, the targeted braking force FT may be determined according to other sensors than those of the brake pedal. For example, the sensors Sw measuring the speed of rotation of the wheels w may determine that the speed of rotation of a wheel w is abnormal with regard to the travelling speed of the vehicle v. This can happen for example, when a wheel w tends to be locked during a braking phase, or when a wheel w slips at the starting of the vehicle v. Under such circumstances, a specific targeted braking force FT may be determined. In general way, the targeted braking force FT may be determined according to any sensor that transmits a need of braking of one or more wheels w of the vehicle v.

The present step of determining a targeted braking force FT, advantageously comprises the determination of a reference profile of the rotation speed of the braked wheels w, in particular when the braking instruction originates from the driver. In other words, based on a braking request of the driver, an ideal profile of the speed of rotation of the wheels w is determined. The reference profile of the rotation speed of the braked wheels w may be a straight line, from an initial high speed to a targeted low speed, with a given slope, depending on the requested braking strength. However, any other ideal profile may be computed. Such a reference profile of rotation speed of the wheels w allows to determine whether one or more of the brake safety functions needs to be initiated. In particular, when the rotation speed of one or more of the braked wheels w departs from such a reference profile, being either lower or higher, then an appropriate safety function may be activated. A reference profile of rotation of the braked wheels is determined at each braking request, originating from the brake pedal sensors, and thus from the driver, or from any other sensor. For example, each variation of the position of the driver's foot on the brake pedal 6, is considered as a new braking request and initiates a novel reference profile of rotation of the wheels.

The present method further comprises the step of applying a main braking force E3a and a complementary braking force E3b to the wheels equipped with a bi-energy actuator 3.

The main braking force E3a is preferably delivered by the pneumatic brake actuators 3a, and the complementary braking force E3b is delivered by the electrical brake actuator 3b.

In general way, the main braking force E3a, is determined in such a way to not be able to block the wheels, when no complementary braking force is applied. To this extend, the main braking force E3a may be determined in various ways.

Figure 4:
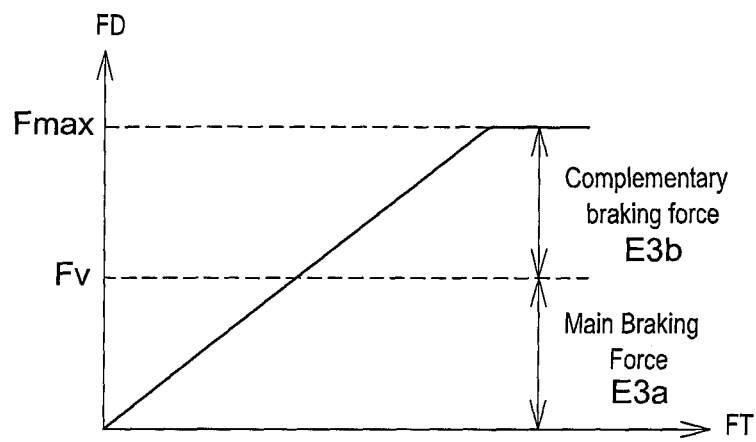
FIG. 4: Example of management of the main braking force and the complementary braking force

In a first mode, the main braking force E3a may be applied up to a predetermined threshold value Fv, as depicted in FIG. 4. In particular, for a targeted braking force FT equal or below a certain threshold value Fv, the actually delivered braking force FD is exclusively provided by the pneumatic actuator 3a, and corresponds to E3a. Such a threshold value Fv may be predetermined as a fraction of the maximum braking power Fmax of the braking system. The threshold value Fv may correspond for example to about 30%, 50%, or 60%, or 70% of the maximum braking power Fmax of the braking system. In case the targeted braking force FT is above the threshold value Fv, the electric actuator 3b may be activated to provide a complementary braking force E3b, in such a way that the delivered braking force FD corresponds to the targeted braking force FT.

The threshold value Fv at which the complementary braking force E3b is applied may optionally vary with the payload of the vehicle, or other parameters. For example, the braking force may be exclusively provided by the pneumatic actuator 3a for a targeted braking force FT below or equal to about 70% of the maximum braking force Fmax if the vehicle is loaded, and for a targeted braking force FT below or equal to about 50% of the maximum braking force Fmax if the vehicle is empty. Any other parameter may be used to optimize the threshold value Fv. For instance, information available through sensors or communication means may be considered during the mission. Such information may relate to the weather conditions, or other aspects.

Such a limitation of the main braking force E3a avoids blocking the wheels during the course of the vehicle, by a too strong activation of the pneumatic actuators 3a. The threshold values hereby given are indicative values, which may be easily optimized or fine-tuned by one skilled in art, depending on other relevant parameters, such as the type of the vehicle. It has to be noted that under this first mode, the ratio between the main braking force E3a and the complementary braking force E3b is not constant and depends on the targeted braking force FT.

Also, the threshold value Fv may depend on the origin of the braking request. A given threshold value can be set up for a request transmitted from the sensors of the brake pedal, and thus for a driver's request, and a different threshold value may be applied in case the braking operation is triggered by another sensor, such as a sensor Sw measuring the rotation speed of a wheel w or any other sensor.

Figure 5:
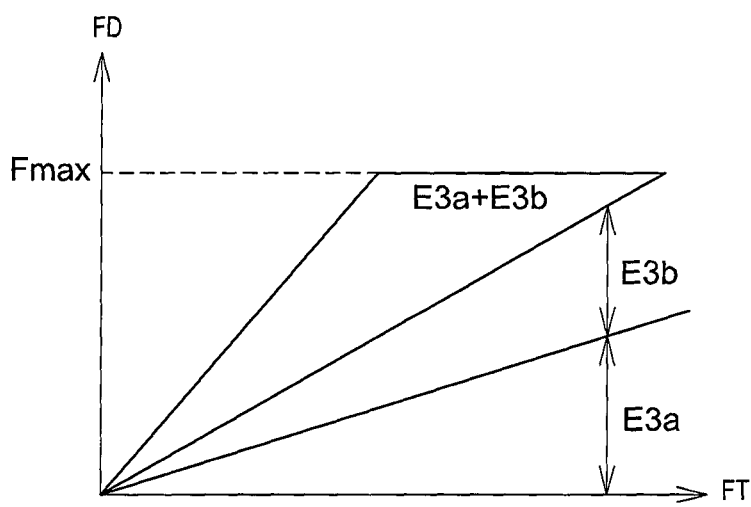
FIG. 5: example of ratio between the main brake force and the complementary brake force
Figure 6:
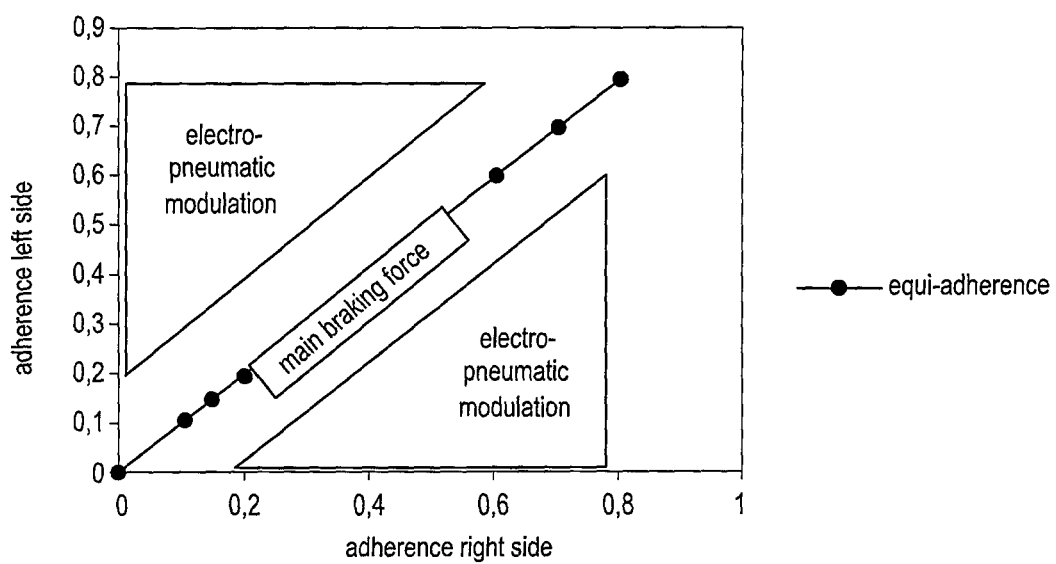
FIG. 6: domain of application of the main brake force and the complementary brake force

In a second mode, both pneumatic actuator 3a and electric actuator 3b are activated independently of the targeted braking force FT, as shown on FIG. 5. For example, the braking force E3a, provided by the pneumatic actuator 3a, may correspond to a certain amount of the targeted force FT. A certain amount may be around 50% or 60% or 70% or 80% of the targeted force FT. The complementary braking force E3b, necessary to reach the targeted braking force FT, is provided by the electrical actuator 3b. In this second mode, like in the first mode, the amount of the main braking force E3a may be adapted according to additional parameters like the payload of the vehicle or other predetermined parameters. For example, a main braking force E3a of about 70% or about 80% of the targeted braking force FT may be delivered when the vehicle is fully loaded, and a main braking force E3a of around 50%, or less, of the targeted braking force FT may be delivered when the vehicle is empty. Any other parameter may be used to optimize the ratio of the main braking force E3a, compared to the requested braking force FT. For instance, information available through sensors or communication means may be considered during the mission. Such information may relate to the weather conditions, or other aspects. It has to be noted that under this second mode, the ratio E3a/E3b is constant under given running conditions, for any targeted braking force FT.

The ratio E3a/E3b may depend on the origin of the braking request. A given ratio can be set up for a braking request transmitted by the sensors of the brake pedal, and thus for a driver's request, and a different braking ratio may be applied for example, when the braking request is transmitted from a rotation speed sensor of a wheel w or any other sensor.

In both modes, the complementary braking force E3b is provided by the electrical actuator 3b in such a way that the delivered braking force FD reaches the requested braking force FT.

An intermediate mode is also contemplated, wherein the braking force is fully provided by the pneumatic actuator 3a up to a certain threshold value Fv, and where the main braking force E3a still increases while the electrical actuator 3b is activated, above the threshold value Fv.

In a preferred embodiment, the main braking force E3a is equal or higher than the complementary braking force E3b, in accordance with formula (1):

$$E3a \geq E3b \tag{1}$$

The method of the present invention further comprises a step of monitoring the applied braking force FD.

The applied braking force FD may be indirectly determined according to the speed of rotation of the wheels w of the vehicle v, compared to a reference. The speed of the rotation of each wheel w is preferably measured by the means of a wheel rotation sensor Sw, which is able to determine a speed of rotation of 0 km/h. Monitoring the speed of rotation of the wheels w includes the sensing of the rotation speed and the comparison of the sensed rotation speed with a reference profile of the rotation speed of the wheels w, potentially determined in the first step. Alternatively, the speed of rotation of the wheels w may be compared to the travelling speed of the vehicle v, in order to identify a discrepancy between the speed of the vehicle v and the rotation speed of one or more wheels w.

Alternatively, or in addition, the delivered braking force FD may be determined by the mean of specific sensors. The delivered braking force FD may be directly measured by the mean of a braking force sensor S4 on each wheel. Alternatively, or in addition, the pneumatic braking force E3a may be determined by a pressure level sensor S2, and the electrical braking force E3b may be determined separately, by the mean of an electrical power consumption sensor S1. The resulting delivered braking force FD, may then be computed.

Further, the position of the brake piston may be monitored by the mean of a brake piston position sensor S3.

Preferably, the present method comprises the monitoring of the total braking force applied on the brake caliper 3c, by the mean of a sensor S4, as well as each partial braking forces E3a and E3b of each actuator 3a and 3b, by the mean of sensors S1 and S2.

Each wheel rotation speed sensor Sw, electrical power consumption sensor S1, and brake piston position sensor S3, if any, are connected at least to the first ECU 4, which monitors the electrical braking force E3b as well as the activation of the electric brake actuator 3b. The air pressure sensor S2b and the pressure level sensor S2 are preferably connected to a second ECU 5, which monitors the braking force E3a and the pneumatic actuator 3a. The first ECU 4 and the second ECU 5 are both connected to the brake pedal 6. Both ECU 4 and 5, may further be connected to a data bus 7.

The braking force of the pneumatic brake actuator 3a and the electric brake actuator 3b may be adjusted to each other, depending on predetermined parameters and the running conditions.

The main braking force E3a may be applied either before or concomitantly, or after the complementary braking force E3b. Preferably, the complementary braking force E3b is applied slightly before the main braking force E3a, due to the better reactivity of the electrical system.

The method of the present invention further comprises a step of modulating one or more of the main braking force E3a and the complementary braking force E3b. The modulation of the main braking force E3a is generally performed equally on several wheels w, and in particular on two wheels of a same axle. The modulation of the main braking force E3a may be initiated in response to an abnormal rotation speed of a wheel w, with regard to the reference profile of rotation speed determined in the first step. It may be initiated for example to avoid the locking of a wheel w, or on the contrary to improve the braking of a wheel w.

It is advantageous that the main braking force E3a may be modulated according to the rotation speed of the braked wheel. The speed of rotation of the braked wheel is monitored while the main braking force E3a is applied. Even though the main braking force E3a is predetermined to be low enough to avoid the locking of the wheels w under most of the conditions, a punctual or temporary loss of adherence may occur. This may provide the locking of a braked wheel w if no release of the main braking force E3a is performed. The speed of rotation of the wheels w may be compared to the reference profile of the rotation speed potentially determined with the braking request FT, and discussed above. In practice, once the rotation speed of a wheel w is sensed to be inferior to the reference value, a risk of locking is anticipated and the main braking force E3a is modulated.

The term "modulated", herein, should be understood as being in general either increased or decreased. However, when a risk of locking is determined, the term "modulated" preferably denotes a release, or decrease, of the braking force. On the opposite, in the context of a lack of braking force, the term "modulated" preferably denotes an increase of the braking strength.

The main braking force E3a may be released only on the specific wheel that departs from the reference value. However, depending on the architecture of the braking system of the vehicle v, the main braking force E3a, may be equally released on several wheels w, and in particular on both wheels w of a same axle, even though loss of adhesion is determined only on one of the wheels.

In case the main braking force E3a is equally released on several wheels, due to a partial or complete loss of adhesion of one of the wheels, it is necessary to compensate the lack of braking force of the other wheels in order to avoid a global loss of the braking efficiency. Thus, the complementary braking force E3b is modulated on the other wheels in such a way to compensate the lack of strength of the main braking force E3a.

As an example, it may be determined, upon braking request of the driver, that 60% of the targeted braking force FT should be provided, to an hybrid brake actuator 3, by the pneumatic brake actuator 3a, which delivers the main braking force E3a. Thus, 40% of the targeted braking force FT should be delivered by the electrical brake actuator 3b, as the complementary braking force E3b. When applying the braking power, it may be determined that the rotation of one of the wheels w departs from the reference profile of the rotation speed. The main braking force E3a is thus released from about 60% to a lower value, like 50% of the targeted force FT or lower. Such a braking release impacts at least two wheels of a same axle. The complementary braking force E3b is therefore modulated accordingly for each wheel individually. In particular, no complementary braking force is applied on the first wheel, sensed to depart from the reference profile of the rotation speed. More than 40% of the targeted braking force FT is applied on the opposite wheel, by the means of the corresponding electrical actuator 3b, in order to compensate the loss of braking strength of the pneumatic actuator 3a. In particular, if the main braking force E3a is released from around 60% to around 50%, then, the complementary braking force E3b is increased from about 40% to about 50% on the opposite wheel. For the wheels which are not impacted by the release of the main braking force E3a, the regular complementary braking force E3b of 40% is applied.

Under other conditions, it can be determined that the main braking force E3a is increased if it is sensed that one or more of the braked wheels w is not enough braked, compared to the braking request FT. This may be due to wear of the braking system, to defect of the complementary braking force E3b, or to any other reason. The increase of the main braking force E3a may also be triggered in response to an uncontrolled deviation of the vehicle v from its trajectory. The increase of the main braking force E3a may be performed on the specific wheel lacking braking strength. However, depending on the architecture of the braking system of the vehicle v, the main braking force E3a, is usually equally increased on several wheels, and in particular on both wheels of a same axle, even though the lack of braking strength is determined only on one of the wheels w. In case the main braking force E3a is equally increased on several wheels, due to a partial or complete lack of braking strength on one of the wheels, there is a risk of locking the opposite wheel of the axle, which does not lack braking strength. Thus, the complementary braking force E3b is modulated in such a way to compensate the increase of the main braking force E3a. In particular, the complementary braking force E3b is decreased on the wheel opposite to the wheel on which the main braking force E3a is increased.

The modulation of the complementary braking force E3b is preferably performed on each wheel individually. The modulation of the complementary braking force E3b may be triggered in response of the modulation of the main braking force E3a on a wheel which is not in need thereof, as described above. In that case, the modulation of the complementary braking force E3b compensates the potential negative effects of the modulation of the main braking force E3a. Thus, it provides an improved mean to apply the safety functions like ABS, ESP, or TCS.

The complementary braking force E3b may still be directly modulated in function of the rotation speed of the wheels w and comparison to the reference profile of the rotation speed of the wheels. While both main braking force E3a and complementary braking force E3b are applied, it may be determined that one or more of the wheels w depart from the reference profile of the rotation speed. Under these circumstances, precedence is preferably given to the complementary braking force E3b, which is released on the wheel or wheels for which the adherence is lower, while the main braking force E3a is maintained at its original value. This provides a direct ABS function for each wheel independently. When the rotation speed of a wheel w is determined to be too high with regard to the reference profile of the rotation speed, the complementary braking force E3b may be directly increased on the concerned wheel, independently of the other wheels w of the vehicle v. In that case, there is no need to modulate the main braking force E3a. The direct over-activation of the electrical actuator 3b thus provides a mean of efficiently controlling the trajectory of a vehicle v.

The complementary braking force E3b may still be independently activated and modulated upon signal of a sensor different from the brake pedal sensor.

The modulation of one or more the main braking force E3a, and the complementary braking force E3b may be object of limitation. In particular, it may be predetermined that the difference of the actual braking strength FD applied on two opposite wheels w of a same axle should not be higher than a certain threshold value. More specifically, the difference of the actual braking forces FD1 and FD2 applied on two opposite wheels of a same axle may not be higher than about 50%, or 40% or 30% or 20% of the highest of the two braking forces FD1 and FD2. The threshold value may depend of the type of vehicle, however, in general way, the modulation of the braking forces E3a and E3b is performed in such a way to not initiate a too strong lateral deviation in the course of the vehicle v.

Precedence may be given to the modulation of the main braking force E3a or to the modulation of the complementary braking force E3b. In the first option, the safety functions are performed by the pneumatic braking system and further optimized by the electric actuators 3b to compensate the potential side effects of the pneumatic braking system.

This first option is particularly adapted if the main braking force E3a is applied according to the first mode above described. It is possible that only the main braking force E3a is applied, if the braking request FT remains under the threshold value Fv, and that ABS, ESP functions are operated by the pneumatic system, and compensated by the electrical actuators 3b. The second option, when precedence is given to the modulation of the complementary braking force E3b, is particularly suitable if both pneumatic 3a and electric 3b brake actuators are activated concomitantly, according to the second mode above described. The modulation of the electric actuators 3b being usually faster and more precise than the modulation of the pneumatic actuators 3a, such an arrangement allows a very efficient braking operation under safety conditions.

Thus, it has to be understood that the modulation of the main braking force E3a and/or the complementary braking force E3b includes the release of the braking strength on the wheel or wheels having the less adherence, and the increase of the braking strength on the wheel or wheels having the highest adherence.

It may be provided that the total delivered braking force FD, combining E3a and E3b, is limited to the maximum braking power of the pneumatic actuator 3a alone. Whether the ratio E3a/E3b is constant or variable, the complementary braking force E3b ceases to apply as soon as the total braking force reaches the maximum braking power Fmax of the pneumatic actuator 3a. This avoids over constraints on the braking system. In other words, the braking forces are applied according to the condition (2) below:

$$FD = E3a + E3b \leq Fmax \quad (2)$$

Wherein

FD denotes the actually delivered braking force,

E3a denotes the main braking force,

E3b denotes the complementary braking force and wherein Fmax denotes the maximum braking force available by the pneumatic actuator 3a alone.

Beside the safety functions, the modulation of one or more of the main braking force E3a and the complementary braking force E3b allows to compensate potential failure of one of the pneumatic or electric braking system. In particular, the main braking force E3a may be increased up to the maximum available braking force Fmax, or at least above the threshold value Fv, or above the predetermined ratio E3a/E3b, in case the complementary braking force E3b is not available. This can happen in case of defect of one or more electrical actuator 3b. The braking force on the other wheels w is compensated in the same way as above described. Similarly, in case of defect of the pneumatic system, the over-activation of one or more electrical actuators 3b may be triggered.

A failure of the pneumatic brake system may be detected for example during the monitoring of the rotation speed of a braked wheel w, or by the means of one or more of the pressure level sensor S2, and the sensor S2b. A failure of the electrical braking system may be detected during the monitoring of the rotation speed of a braked wheel w, or by the mean of one or more of the electrical power consumption sensor S1, or the piston position sensor S3.

It can be provided that, when a defect is identified in the pneumatic system, even during a non-braking period, then the safety functions of the pneumatic system are deactivated. Thus, precedence may be given to the electrical system to directly modulate the complementary braking force E3b, either to compensate the defect of the pneumatic system, or to provide the safety function like ABS, ESP, or TCS, or both.

The modulation above described, either related to the main braking force E3a or to the complementary braking force E3b, is automatic. When the modulation refers to a release or an increase of the braking force, such a release or increase of the braking force may be operated completely or partially. For example, it can be determined that, when the rotation speed of a wheel w departs from the reference profile of the speed of rotation, either the complementary braking force E3b or the main braking force E3a, is decreased by about 10% or 20% or 50%, or 100%, or increased by about 10% or 20% or 50%, or 100%. For example, the braking force may be partly decreased by a certain amount, such as around 10% or 20%, and further decreased in case the wheel still departs from the reference profile of speed of rotation. The same sequential mode may apply for increasing the braking strength. Alternatively, one of the complementary braking force E3b or main braking force E3a, may be fully released, to completely liberate a wheel w, and applied again at its original strength. The same binary mode may apply for increasing the braking strength. In particular, full braking power Fmax may be applied and then released at the original value. The main braking force E3a, as well as the complementary braking force E3b, may be applied and released several times during a braking phase, at a predetermined frequency, or in response to the permanent measurements of the speed of rotation of the wheels.

The modulation of one or more of the main braking force E3a, and the complementary braking force E3b, may also apply outside a braking phase, in absence of any braking request from the driver. This may be the case when the rotation speed of a wheel w does not correspond to the running speed of the vehicle v. In case of slippage of one wheel w of an axle, for example at starting of the vehicle v, the corresponding electrical actuator 3b may be automatically activated to block the slipping wheel w, in order to transfer the traction power to the other wheel of the axle. The electric brake actuator 3b of the slipping wheel w may be applied at its full power or only at a certain predetermined value, such as about 10% or 20% or 50% of its maximum strength. The electric brake actuator 3b is automatically released as soon as the wheel rotates at a suitable speed. Thus, the automatic activation of one electrical actuators 3b of an axle allows to control the traction of the vehicle.

The first ECU 4 may optionally be connected to a steering sensor and/or a yaw rate sensor (not shown), allowing to detect an uncontrolled trajectory of the vehicle v, and/or comprise an electronic stability program (ESP). In case of abnormal deviation of the vehicle v, electrical brake actuators 3b may be automatically and selectively activated or over activated, for one or more wheels, in order to reestablish the proper trajectory of the vehicle. As above, the electric braking actuators 3b may be fully activated, at its maximum power, or partly activated, meaning that only a certain amount of the available braking force is applied. More particularly, it may be determined that about 10% or 20% or 50% or 100% of the maximum braking force of the electric brake actuators 3b is provided. It can be further determined that the applied braking force is not the same for all the electric brake actuators 3b. Depending on the running conditions, and on the slipping intensity, it is possible that about 10% or 20% of the maximum braking force of a brake actuator 3b is provided at a front wheel, and 50% or more of the maximum braking force of another brake actuator 3b is provided at a rear wheel. Any other combination is possible, and automatically determined according to the running situation, since each hybrid brake actuator 3 is independently managed.

The safety functions hereby described may replace one or more of the safety functions of a traditional pneumatic braking system. This allows using simplified corresponding pneumatic elements, or downsizing the pneumatic braking system, while maintaining the requested level of security. More particularity, the ESP pneumatic valves, the ABS pneumatic valves, and the pneumatic features involved in the TCS, are either simplified systems or absent, and the corresponding functions are performed with the electrical actuators 3b.

Alternatively, the method hereby described may be implemented in addition to the safety functions of a pneumatic braking system. Under such conditions, the activation of the electric brake actuators 3b allows keeping the ABS, ESC and TCS functions, normally performed by the pneumatic braking system, when the pneumatic braking system fails. To this extend, precedence may be given to the pneumatic braking functions as long as no default is detected. In particular, the braking request is managed with the two brake actuators 3a and 3b according to the above described method, using the appropriate force ratios E3a/E3b, and the safety functions are exclusively performed by the pneumatic system. When a defect is identified or detected within the pneumatic system, by the mean of one or more of the pneumatic sensors S2, S2b, then, the safety functions are performed by the electrical actuators 3b, alone.

Beside the mere safety functions, the electric brake actuators 3b may be activated or over-activated to compensate a lack of strength of the pneumatic braking system with regard to the braking request FT delivered by the brake pedal 6.

In a first possible mode, wherein the complementary braking force E3b is applied after the pneumatic braking force E3a reaches a certain threshold value Fv, the effective air pressure E3a is monitored at the pneumatic brake actuator 3a by the mean of the sensor S2, and compared to the braking request FT. If the air pressure does not reach the level requested by the driver, then the electric actuator 3a of the corresponding wheel is activated in such a way that the delivered braking force FD corresponds to the requested braking force FT. For example, where it is determined that the main braking force E3a is applied up to 50% of the maximal braking force Fmax before the electric actuators 3b are activated, and that the effective pneumatic pressure does not reach such a strength upon a driver's request, then the corresponding electric actuator 3b is activated in such a way that the braking force FD delivered to each wheel corresponds to the driver's request FT. Similarly, when a defect is identified in the air pressure sensor S2b, in such a way that the available pressurized air is not enough to reach the braking request FT, then the electrical actuator 3b is activated or over-activated.

In another possible mode, wherein the ratio E3a/E3b does not depend on the requested braking force FT, and that the pneumatic pressure does not correspond to the expected value, the electric actuators 3a may be over activated in order to compensate the lack of strength of the pneumatic system. As an example, where it is predetermined that the main pneumatic braking force E3a corresponds to 60% of the requested braking force FT, and that only a part of the 60% of the braking force is effectively delivered by the pneumatic braking system, then the electric brake actuators 3a is over-activated, to deliver more strength than initially determined, and reach the requested braking force FT.

Alternatively or in addition, it may be determined that the effective braking force FD applied to the brake caliper 3c, and resulting from the concomitant braking forces E3a and E3b, is monitored, by the mean of a dedicated sensor S4, and compared to the requested braking force FT. In case the effective braking force FD does not reach the requested braking force FT, it may be determined that the electric brake actuator 3b is over-activated in such a way to compensate the observed lack of braking strength.

Thus, the electric brake actuator 3b may be activated or over-activated, if the pneumatic braking strength does no reach a certain amount of the requested braking force FT, or if the braking force effectively delivered FD to the wheel does not reach the requested braking force FT.

The method may further comprise the automatic activation of the electric brake actuators 3b in anticipation of an obstacle. An obstacle may be identified by any detection system within the vehicle v, or communicated to the vehicle through usual communication means. In case the speed of the vehicle v appears to be too high with regard to the distance with the obstacle, the electric actuators 3b may be automatically activated before the driver presses the brake pedal. Such an automatic activation may be preceded by a phase wherein the braking piston is approached to the brake caliper 3s, without providing effective braking power, in order to improve the reaction time of the braking system once the driver presses the brake pedal. The piston is preferably approached by the electric brake actuator 3b, usually more precise than the pneumatic brake actuator. In case a braking power is effectively provided, the electric brake actuator 3b may be fully activated or partly activated. Further, all the electric brake actuator 3b may be activated or only those of one or more axle. In addition, the braking force delivered may not be the same for all the wheels. For example, it may be determined that in case of an approaching obstacle, the electric brake actuator 3b of the front axle and of the trailer or the semi-trailer, are activated at about 20% or about 30% of their maximum braking capacity, while the electric brake actuators 3b of the rear axles are either not activated or activated at around 10% of their maximum braking capacity. Any other combination may be predetermined by one skilled in the art.

The invention claimed is:

1. A method of managing a braking force on a wheel w of a vehicle v equipped with at least a pair of hybrid brake actuators and at least a control unit, each brake actuator comprising a first brake actuator and a second brake actuator, said method comprising the steps of:
   determining, by the at least a control unit, a targeted braking force;
   applying a main braking force to the wheel w by the first brake actuator;
   applying a complementary braking force to the wheel w by a second brake actuator in such a way that the targeted braking force is actually delivered;
   monitoring an actual braking force delivered to the wheel w; and
   modulating one or more of the main braking force and the complementary braking force.

2. The method according to claim 1, wherein the first brake actuator is a pneumatic actuator and the second brake actuator is an electric actuator.

3. The method according to claim 2, wherein the electric actuator is not reversible.

4. The method according to claim 1, wherein the targeted braking force is determined according to information transmitted by brake pedal sensors or other sensors selected from a sensor.

5. The method according to claim 1, wherein the main braking force is applied up to a given threshold, and wherein the complementary braking force is provided for a braking request above a value of the given threshold.

6. The method according to claim 1, wherein the main braking force and the complementary braking force are both applied at a constant ratio.

7. The method according to claim 1, wherein the actual braking force FD remains equal or below a maximum braking force Fmax, according to:

$$FD = E3a + E3b < Fmax$$

Wherein:
FD denotes the actual braking force effectively delivered;
E3$a$ denotes the main braking force;
E3$b$ denotes the complementary braking force; and
Fmax denotes the maximum braking force available by the pneumatic actuator alone.

8. The method according to claim 1, wherein the monitoring of the actual delivered braking force is performed by the mean of one or more of a rotation speed sensor of a wheel, a pressure sensor, a piston position sensor, and an electrical power consumption sensor.

9. The method according to claim 2, wherein the electric actuator is activated or over-activated to compensate for a lack of braking strength of a pneumatic system on the wheel w.

10. The method according to claim 1, wherein in absence of the main braking force, the electric actuator is automatically activated if a traveling speed of the vehicle v is too high with respect to an approaching obstacle.

11. The method according to claim 1, wherein the complementary braking force is applied before the main braking force.

12. The method according to claim 1, wherein the complementary braking force is controlled by a first electronic control unit (ECU) of the at least a control unit and the main braking force is controlled by a second ECU of the at least a control unit.

13. The method according to claim 1, wherein the main braking force may be equally modulated at several wheels, and wherein the complementary braking force is modulated at each wheel w independently.

14. A vehicle comprising at least a pair of hybrid brake actuators, each brake actuator comprising a first brake actuator and a second brake actuator, and wherein a braking force is managed according to claim 1.

* * * * *